United States Patent
Conway

(10) Patent No.: US 11,275,849 B2
(45) Date of Patent: Mar. 15, 2022

(54) CRYTOGRAPHY DATA MANAGEMENT

(71) Applicant: VISA INTERNATIONAL SERVICE ASSOCIATION, San Francisco, CA (US)

(72) Inventor: Adam Conway, Bellevue, WA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 365 days.

(21) Appl. No.: 16/530,478

(22) Filed: Aug. 2, 2019

(65) Prior Publication Data

US 2021/0034761 A1 Feb. 4, 2021

(51) Int. Cl.
*G06F 11/30* (2006.01)
*G06F 21/60* (2013.01)
*G06F 16/23* (2019.01)
*G06F 12/14* (2006.01)

(52) U.S. Cl.
CPC ........ *G06F 21/602* (2013.01); *G06F 16/2379* (2019.01)

(58) Field of Classification Search
CPC ............................ G06F 16/2379; G06F 21/602
See application file for complete search history.

(56) References Cited

U.S. PATENT DOCUMENTS

| | | | | |
|---|---|---|---|---|
| 10,303,895 B1* | 5/2019 | McCluskey | ......... | G06F 21/6245 |
| 10,740,474 B1* | 8/2020 | Ghetti | ................... | H04L 9/3242 |
| 10,841,286 B1* | 11/2020 | Davidovics | ............ | G16H 10/60 |
| 2007/0074047 A1* | 3/2007 | Metzger | .................... | H04L 9/12 |
| | | | | 713/193 |
| 2014/0281511 A1* | 9/2014 | Kaushik | ................ | G06F 21/602 |
| | | | | 713/164 |
| 2014/0281512 A1* | 9/2014 | Arasu | .................... | H04L 63/062 |
| | | | | 713/165 |
| 2015/0019879 A1* | 1/2015 | Haerterich | ............ | G06F 21/602 |
| | | | | 713/193 |
| 2015/0143112 A1* | 5/2015 | Yavuz | ....................... | H04L 9/00 |
| | | | | 713/165 |
| 2018/0048674 A1* | 2/2018 | Black | ..................... | H04W 12/03 |
| 2018/0309735 A1* | 10/2018 | Barnett | ..................... | H04L 9/14 |
| 2019/0340381 A1* | 11/2019 | Yavuz | ....................... | H04L 9/00 |
| 2020/0134199 A1* | 4/2020 | Conway | ............. | G06F 16/2468 |
| 2021/0034761 A1* | 2/2021 | Conway | ............. | G06F 16/2379 |

* cited by examiner

*Primary Examiner* — Gary S Gracia
(74) *Attorney, Agent, or Firm* — Loeb & Loeb LLP

(57) ABSTRACT

A database management tool performs updates or sequential operations to large databases. A configuration file specifies source, destination (if different than source), encryption status, order, throttling limits, and number of threads to maintain, among other settings. A queue table points the tool at the database to be converted and maintains current row ID and status. The queue table may also hold the location of a hardware security module (HSM) if one is used for encryption, decryption, or hashing. The database management tool may use the configuration file to retrieve a record, perform the specified action, such as sending the record to an HSM for decryption with an old key and encryption with a new key, and replacing the old record with the updated record. The queue table may be updated with a running record of where the last operation occurred to allow rollbacks if necessary.

20 Claims, 3 Drawing Sheets

CRYTOGRAPHY DATA MANAGEMENT

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Comprehensive updates to a database, such as changing encryption keys for individual records, involves downloading a copy of the contents of the database, updating the copy, and restoring the updated contents back to the records of the database. However, for very large databases or those that must remain in use, across-the-board updates can be difficult.

SUMMARY

In an embodiment, a tool may use a configuration file and a queue table to specify the source, destination, intermediate tools if needed, and operations to perform a record-by-record update to a database. The tool is particularly useful for databases with records in excess of 1 million rows or when the database must remain active and accessible during the update process.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Any business or agency dealing with high volumes of suppliers, products, customers, or transactions probably uses at least one database to manage the volume of information generated. In many cases, these databases need maintenance. For example, if a cryptographic key is compromised or expired, the contents of a database may need to be re-encrypted with a new key. In another example, as security concerns increase and computing power follow's Moore's law, a hash table may need to be regenerated with a more complex hash algorithm.

Ideally, a database needing an across the board update would be frozen, all the contents downloaded, the operation performed on the contents, such as decrypting and re-encrypting, the new data uploaded, and the database returned to service. However, in a great many situations, such a clean process may not be possible. Some databases may not be able to go offline, even for a short time. In other cases, the database may be so large that bulk processing may not be practical. In yet other cases, the resources required to perform the operation, such as a hardware security module (HSM), may be limited or be committed to multiple systems so that the HSM's sole use for a bulk update to one database may not be practical.

Figure 1:
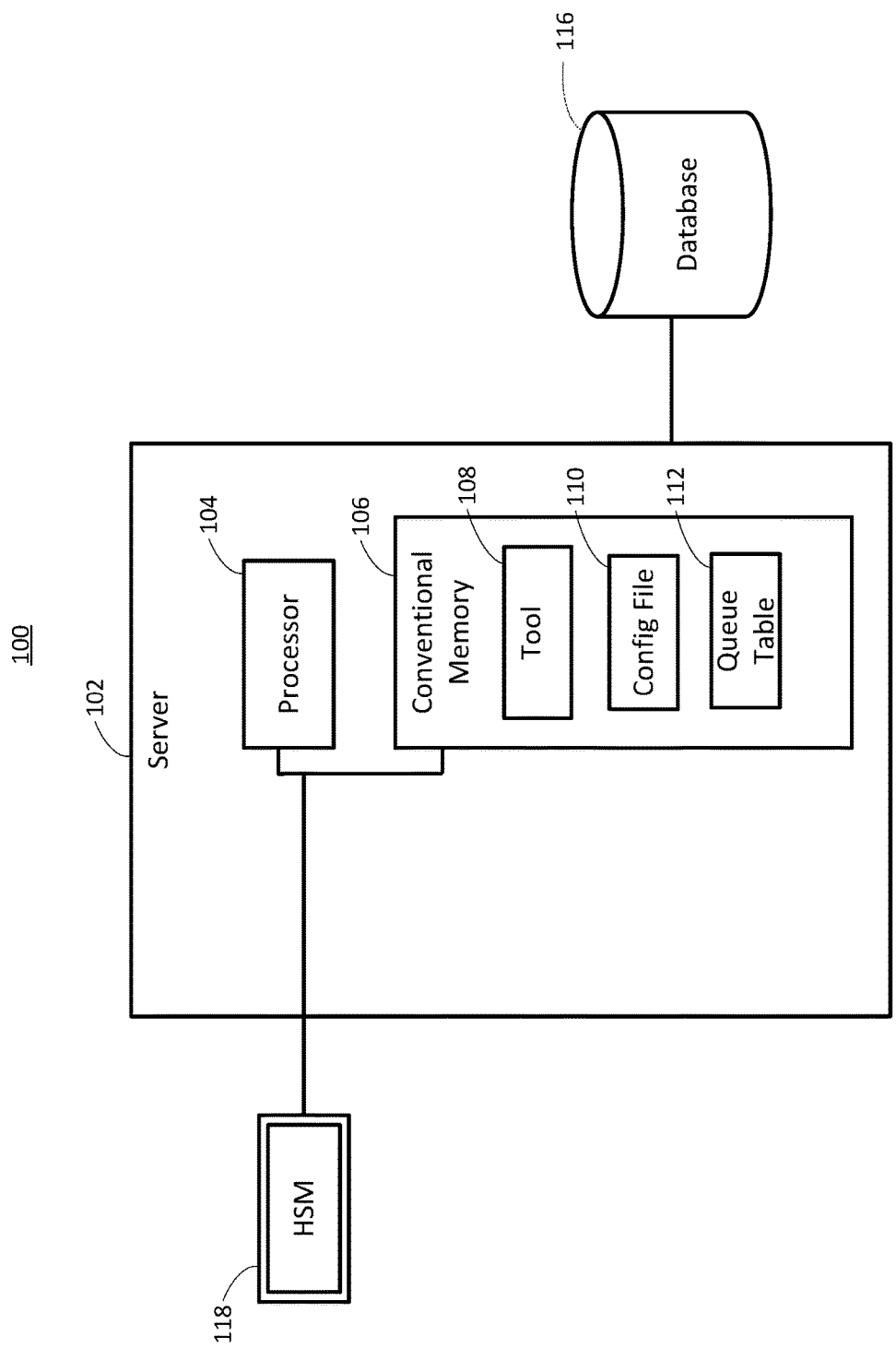
FIG. 1 is a block diagram depicting a database system in accordance with the current disclosure.

Turning to FIG. 1, a system 100 for use in performing updates to databases may include a server 102, a database 116 requiring an update and, optionally an external resource, such as an HSM 118. The server 102 may include a processor 104 and memory 106. The memory 106 may be a combination of conventional volatile or non-volatile memories of any of several technologies but does not include carrier wave or propagated media-type memories. The server 102 may include other well-known components such as a power supply and network interfaces that are not shown for the sake of clarity. The memory 106 may include, among other data and executable code, a tool 108, a configuration file 110, and a queue table 112.

The tool 108 may be a programmatic implementation that allows a record at a time to be selected, updated, and returned. The tool 108 can encrypt or hash existing data with the source being either encrypted or unencrypted data. The source data can span one or more columns of the database 116 to provide a combined encrypted value. In an embodiment, the source and destination may even be the same column. The tool 108 can be pointed at any database, table, column and can output the result in any specified target. The tool 108 may be configured to not overload the database 116 with too many requests to allow continued production use while being updated. The tool 108 may be used to re-encrypt current data with a new key or may be used to change the underlying security algorithm, for example in hashed data. The process supported by the tool 108 may be interrupted at any point in time but is arranged so that the tool 108 will simply continue where it left off. Note that the update discussed here is not an update to the database program itself, but to the contents of the database. Updates to the program associated with creating and allowing access to records is separate from the updating contents of the database and is not contemplated in this disclosure.

In general, the tool 108 may be used to encrypt data, re-encrypt data with new key and/or new algorithm, or hash/rehash data with a new hash algorithm. Any of these operations may be required in the course of business as a result of many different concerns including privacy and security. For example, previously unencrypted data may be encrypted. In another case, because of increased computing power, key lengths may be increased or old algorithms such as DES may be replaced by more secure algorithms such as AES. Hash table calculated with obsolete hash algorithms such as SHA-1 or MD5 may be replaced by SHA-3 to increase hash lengths or to add or change salt values to inhibit rainbow table compromises.

A production database, such as one that performs thousands of operations a second may operate at a given queue level or performance level. Should the tool 108 require too many system resources, such as input/output operations or HSM 118 resources the production operation of the database 116 may become overloaded and not meet production requirements. For example, if a database typically operates at 70% of maximum performance and the tool 108 requires 50% of the system's resources, the production environment may fail. To combat this, the tool 108 may be configured to evaluate its own use of system resources and reduce/limit its own operation rate to an acceptable level. In the above example, the tool 108 may be limited to 5% of the system's resources so that the production environment can continue to operate at a satisfactory performance level. The use of system resources may be calculated as a function of the capacity of the processor 104, access rate of the memory 106 or the database 116, the capacity of the HSM 118 or a combination of these. In an embodiment, the tool 108 may evaluate resource availability after each operation so that momentary increases in system load may be accommodated. It is expected that some database updates may take several months or more to complete in highly active system with stringent resource allocation restrictions.

So that the tool 108 may be more generalized, one or more associated files may be used to direct operations. One such file may be a configuration file 110. Another may be a queue table 112. In some embodiments, the functions of the two separate files may be combined into one file or table, or may be split into even more supporting files or tables.

The queue table 112 may hold data related to the database to be accessed and, if used, the HSM 118. The queue table 112 may also point to the rows to be accessed in the database 116. For example, in one embodiment, all the rows in the database 116 may be selected and their row identifiers used to populate the queue table 112. The queue table 112 may then be used to keep the status of each row as processing continues so that the tool 108 may be reset to the next row after a delay or interruption in the tool's operation. Rollbacks may occur using the queue table 112 as an indicator as to which rows have been processed.

The configuration file 110 may specify database-specific information such as source data location (e.g., column), destination location if not the same as the source, whether or not the source data is already encrypted, key identifiers if need, or whether data in various columns needs to be combined. The configuration file may also include the order in which to process the database 116. Throttling limits for the tool, such as a rate of operations for the HSM 118 or a number of threads for the database may be set in the configuration file 110. The configuration file 110 and queue table 112 may be generated on a per job basis to reflect the nature of the operations and the limits imposed by the overall system 100.

Figure 2:
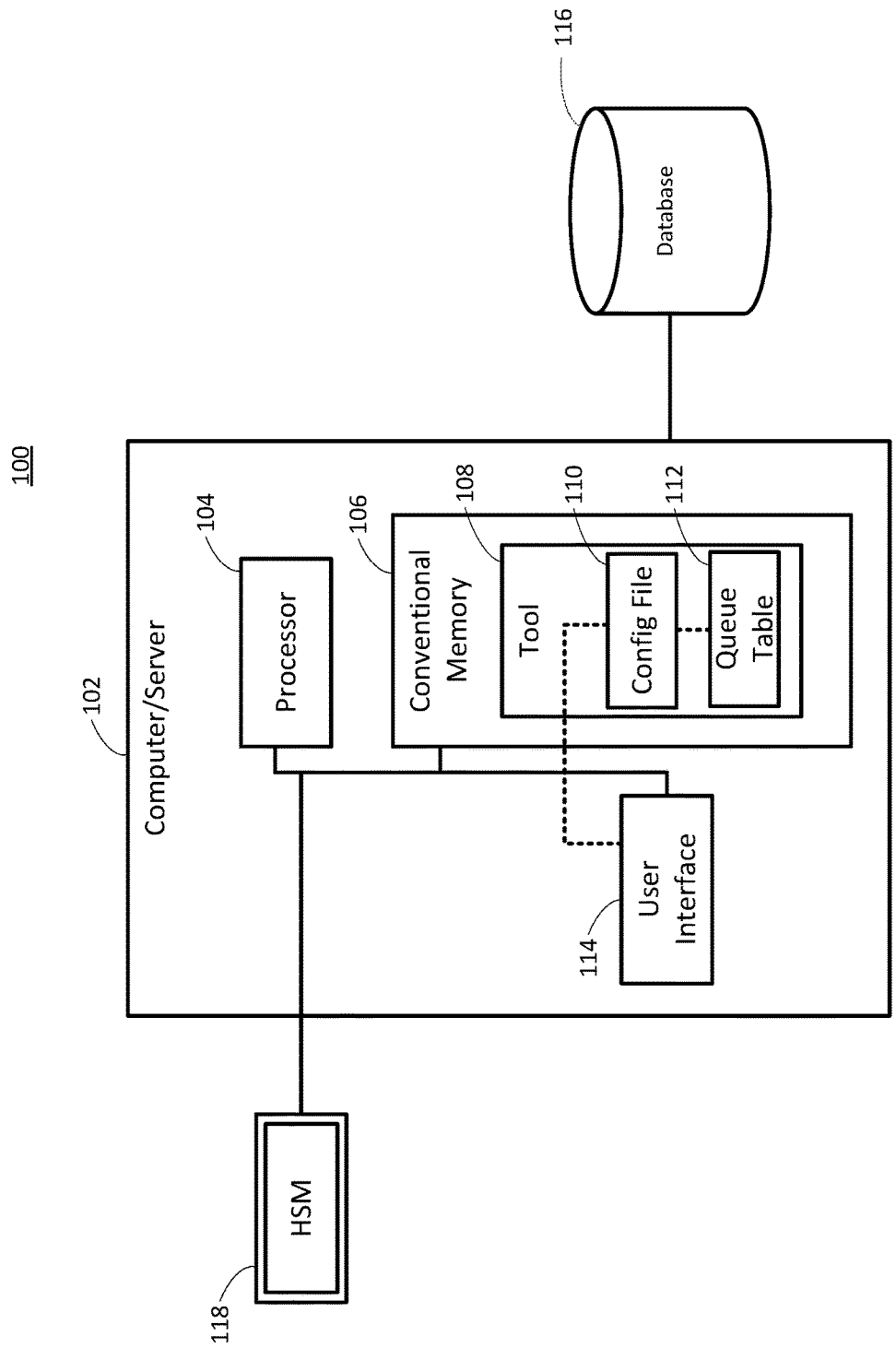
FIG. 2 is a block diagram of another embodiment of the database system of FIG. 1.

An alternate embodiment of the system 100 is illustrated in FIG. 2. A user interface 114 may support directed entry of data for generating the configuration file 110 and the queue table 112. The user interface 114 may prompt the user for, among other things, data source and destination, operation to be performed, and resource usage limits.

Figure 3:
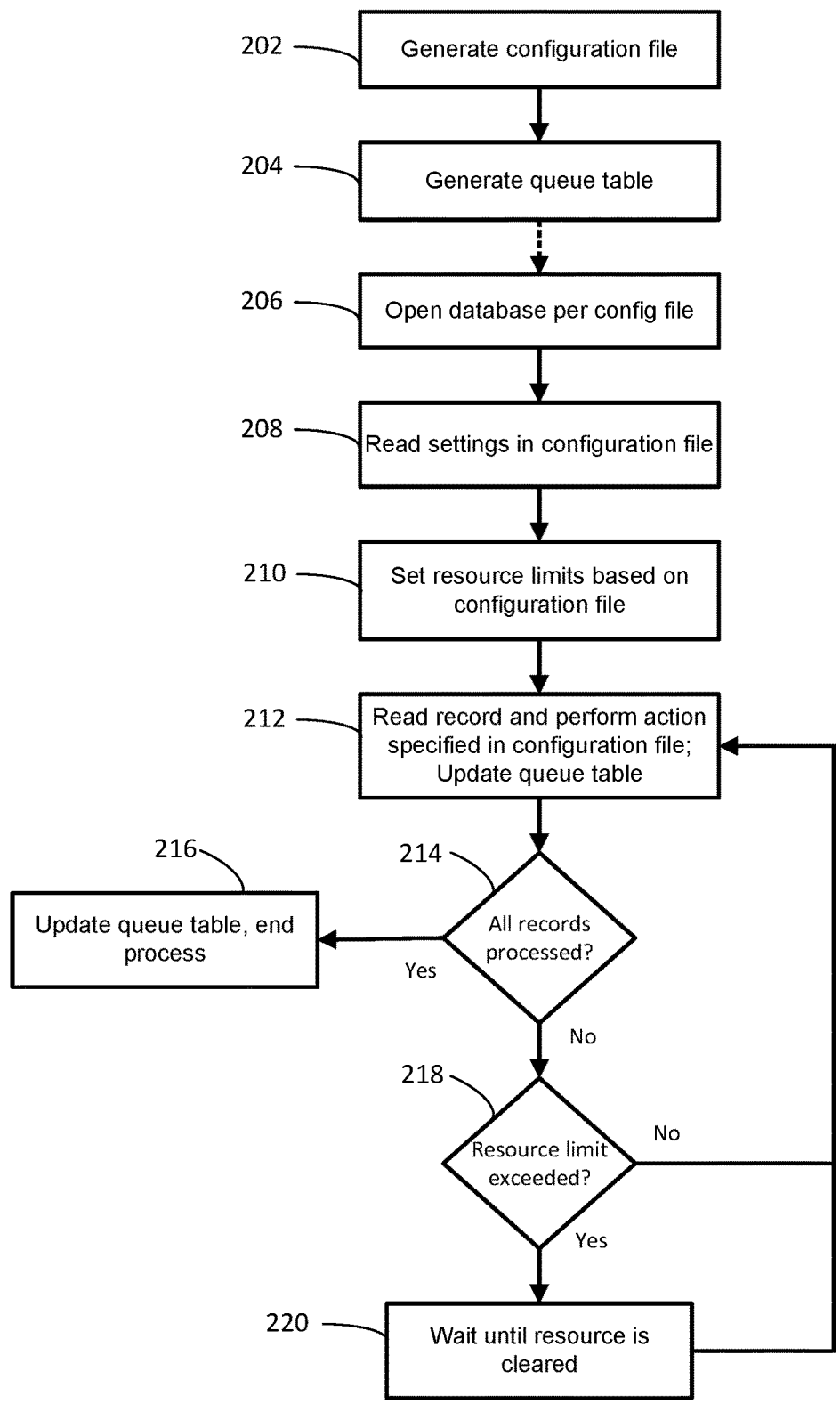
FIG. 3 is a flow chart illustrating a method of performing a cryptographic-oriented update to records of the database illustrated in FIGS. 1 and 2.

FIG. 3 is a flowchart of one method 200 of using a tool 108 to perform an update to a database 1. The method may begin at block 202 with the generation of the configuration file 110. As discussed above, the configuration file 110 may be generated by hand or may be generated via a user interface 114 that may use a rule base or decision tree to prompt a user through the various choices to be made about database 116, HSM 118, data choices and resource limits. Similarly, at block 204, a queue table 112 may be generated by hand or via the user interface 114. As discussed above, the queue table 112 may not only have data used to initiate the update sequence but may be updated as each change to a database record is made.

At block 206, the database 116 indicated is opened for data updates. At block 208 the settings in the configuration file 110 may be consulted regarding data source, destination and operation. At block 210 the tool 108 may set resource limits according to settings in the configuration file 110. These limits may include a maximum number of database threads, a maximum rate of HSM operations, or others.

A database record may be read and operated on at block 212. The operation may include selecting data from a column, sending the data to the HSM 118 for decrypting with a first key, re-encrypting with a second key and receiving the data back from the HSM for re-saving to the database at the same or a different location. In other embodiments, data from one or more columns may be combined with a salt and sent to the HSM 118 for hashing with a new algorithm. The updated hash may be saved in a new location from an existing hash. After the operation is completed, the queue table 112 may be updated to reflect the record that was updated.

Execution may be continued at block 214 where a check may be made if all the records have been processed. The list of records to be processed may be stored in the queue table 112 but other checks such as reaching the last record in the database 116 may also be performed. If all records have been processed, execution may continue at block 216 where the queue table 112 may receive a final update and the processing may be ended.

If at block 214 all records have not been processed, the "no" branch may be taken to block 218 where the tool 108 may determine its current resource usage to determine if a resource limit has been exceeded. In some cases, no explicit determination may be needed. For example, if the limit is set by the number of database threads to use, then the usage is fixed by that limit. However, if a usage rate is set, such as operations per hour, then a determination may be made about the rate being exceeded. Whether explicit or implicit, if the resource limit has been exceeded, execution may continue at block 220 where a delay may be introduced. After an interval, execution may continue at block 212. If, at block 218, the resource limit has not been exceeded then execution may also continue at block 212 until all records have been processed. In a very long update process, the resource limit may be adjusted to accommodate current conditions. For example, a transaction processing system may have higher production demands during the holiday shopping season and choose to further restrict the tool's resource limit. After the holiday season ends, the tool's resource limits may again be increased.

A technical effect of the current system is the ability to perform a database update while allowing production processing to continue. This is accomplished in part by placing a limit on the resources available to the tool 108 so that the update process itself does not hinder production performance.

A system and method in accordance with the current disclosure benefits at least system owners and operators. There is no need to choose between a costly shutdown or failover to a backup system for a full database record update. The system operator can update, for example, the key used for encryption of name/address fields of every record in a database without removing the database from production use.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

I claim:

1. A database management system comprising:
a tool programmatic implementation using executable code stored in a physical memory device and executed on a processor of a computer;
a configuration file stored in the same or a different physical memory, the configuration file comprising a source location of a database, an action, and a resource limit, wherein the configuration file is generated by hand or generated via a user interface uses a rule base or decision tree to prompt a user through the various choices to be made about a database;
and a queue table stored in the same or a different physical memory, the queue table including a row identifier and a status field, the queue table holds the location of a hardware security module (HSM) when one is used for encryption, decryption or hashing, wherein the tool reads the configuration file to determine a source location of elements to read from the database, an action to take on the elements of the database, wherein the tool operates at or below the resource limit, wherein the tool then operates to read a record from the database, perform the action, store an updated record, and update the queue table with an indication of the action performed, the tool operates to selecting data from a column, sending the data to a HSM for decrypting with a first key, re-encrypting with a second key and receiving the data back from the HSM for re-saving to the database at the same or a different location, wherein when all records have not been processed, determining whether to continue the resource limit has been exceeded.

2. The database management system of claim 1, wherein the configuration file further comprises a destination location when different from source location.

3. The database management system of claim 1, wherein action specified in the configuration file a cryptographic operation including one of decrypt, encrypt, or hash.

4. The database management system of claim 3, wherein the configuration file further comprises an address of a hardware security module (HSM) that performs the cryptographic operation.

5. The database management system of claim 4, wherein the resource limit specified in the configuration file is a capacity limit of an available HSM processing capacity that the tool can consume.

6. The database management system of claim 1, wherein the configuration file further comprises data indicating that data at the source location is encrypted.

7. The database management system of claim 1, wherein the configuration file further comprises a number of threads that the tool can use for interacting with the database.

8. The database management system of claim 1, wherein the configuration file further comprises a sequence indicator specifying an order in which the tool is to access the database.

9. The database management system of claim 1, wherein the configuration file further comprises a plurality of source columns and a flag directing the tool to combine the plurality of source columns into one destination column.

10. A method of managing a database using a database management system including
a tool programmatic implementation, a configuration file, and a queue table, the method comprising:
executing the tool using executable code stored in a physical memory of a computer;
reading by the tool from the configuration file a source location of a database to be operated on by the tool, wherein the configuration file is generated by hand or generated via a user interface uses a rule base or decision tree to prompt a user through the various choices to be made about a database;
reading by the tool from the configuration file an action to perform on the database;
reading by the tool from the configuration file a resource limit that constrains to the tool to an upper limit of resources to be used by the tool;
accessing the database according to the source location to retrieve a record;
performing the action on the record to generate an updated record;
storing the updated record;
updating the queue table to indicate completion of the action on the record, the queue table holds the location of a hardware security module (HSM) when one is used for encryption, decryption or hashing; and
responsive to the resource limit not being exceeded, accessing the database to retrieve a next record for performing the action, the tool operates to selecting data from a column, sending the data to a HSM for decrypting with a first key, re-encrypting with a second key and receiving the data back from the HSM for re-saving to the database at the same or a different location, wherein when all records have not been processed, determining whether to continue the resource limit has been exceeded.

11. The method of claim 10, wherein performing the action on the record comprises:
decrypting with a first cryptographic key at least one column of data from the record; and
encrypting with a second cryptographic key the at least one column of data from the record to create the updated record.

12. The method of claim 11, wherein the decrypting and encrypting steps occur at a hardware security module (HSM).

13. The method of claim 10, wherein performing the action on the record comprises performing a hash of one or more columns of the record.

14. The method of claim 10, wherein storing the record comprises storing the updated record in a same location from which the record was retrieved.

15. The method of claim 10, wherein storing the record comprising storing the updated record in a location different from where the record was retrieved.

16. The method of claim 10, further comprising:
determining a resource usage of the tool while performing the action on the record; and
comparing the resource usage to the resource limit.

17. The method of claim 16, wherein the resource limit is a number of database threads used by the tool.

18. The method of claim 16, wherein the resource limit is a percentage of capacity of a hardware security module (HSM) used by the tool for cryptographic operations.

19. A method of managing a database using a database management system including
a tool programmatic implementation, a configuration file, and a queue table, the method comprising:

accessing the database using the tool, the database identified via the configuration file;

reading a record from the database;

performing an action on the record to generate an updated record, the action specified via the configuration file, wherein the configuration file is generated by hand or generated via a user interface uses a rule base or decision tree to prompt a user through the various choices to be made about a database;

storing the updated record at a location specified via the configuration file; and responsive to storing the updated record, adding a log entry to the queue table, the log entry including a reference to the record and the action, wherein the queue table holds the location of a hardware security module (HSM) when one is used for encryption, decryption or hashing, and the tool operates to selecting data from a column, sending the data to a HSM for decrypting with a first key, re-encrypting with a second key and receiving the data back from the HSM for re-saving to the database at the same or a different location, wherein when all records have not been processed, determining whether to continue the resource limit has been exceeded.

20. The method of claim 19, wherein performing the action comprises:

sending the record to a hardware security module (HSM) where a cryptographic operation is performed on the record; and receiving the updated record from the HSM.

* * * * *